United States Patent [19]

Miller et al.

[11] 4,090,168
[45] May 16, 1978

[54] SOLID FILLED VIBRATION ISOLATION MODULE FOR A TOWED SONAR ARRAY

[75] Inventors: Howard A. Miller, Encinitas; Robert R. Smith; Charles S. Nichols, both of San Diego, all of Calif.

[73] Assignee: The United States of America as represented by the Secretary of the Navy, Washington, D.C.

[21] Appl. No.: 797,882

[22] Filed: May 17, 1977

[51] Int. Cl.$^2$ .............................................. B63B 21/00
[52] U.S. Cl. ..................... 340/3 T; 340/7 R; 174/101.5
[58] Field of Search .............................. 340/3 T, 7 R; 174/101.5

[56] References Cited

U.S. PATENT DOCUMENTS

| 3,304,364 | 2/1967 | Hetherington | 174/101.5 |
| 3,369,216 | 2/1968 | Loper | 340/7 R |
| 3,710,006 | 1/1973 | Davis | 174/101.5 |

*Primary Examiner*—Richard A. Farley
*Attorney, Agent, or Firm*—Richard S. Sciascia; Ervin F. Johnson; Thomas Glenn Keough

[57] ABSTRACT

A vibration isolation module is interposed between a sonar array and its towing cable. A number of nylon cords contained within the vibration isolation module normally bear the load induced by the hydrodynamic drag of the array. Since the nylon cords are encased in a rubber-like envelope, noise and vibrations created by the towing cable are damped and prevented from overly interfering with the responsiveness of the sonar array. When, however, the array's drag is increased by, for example, a faster towing speed, the cords stretch and a central braided member bears the load. The braided member has a strength considerably in excess of the nylon cords to assure that the towed sonar array is not lost. Since the braided member is filled with a viscous material and there are no other voids in the rubber-like envelope, the module can be pulled through a hull penetrator to deploy or retrieve the sonar array.

11 Claims, 5 Drawing Figures

SOLID FILLED VIBRATION ISOLATION MODULE FOR A TOWED SONAR ARRAY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Some vibration isolation modules use a fluid within the walls of a hose-like envelope to provide neutral buoyancy. This not only makes retrieval through a hull penetrator unfeasible, but a more objectionable consequence is that the fluid filled modules compromise the acoustical damping capabilities of the module since they do not acoustically decouple an array from its towing cable. The signal degradation caused by the transmission of strumming noises and vibration to the array limited the array's effectiveness. Rubber-like separators between the array and towing cable have been used with some degree of success, however; when the array's drag became too great, (if, for example, the array was pulled faster through the water) rubber separators tended to fail. Towing the arrays by rigid cables directly, or through separators having rigid cables, again would transmit the objectionable cable noise to the array. Thus, there is a continuing need in the state-of-the-art for a vibration isolation module interposed between a towed array and its towing cable which is capable of isolating the array, of being fed through a tight, hull penetrator, and which can bear the load under a variety of conditions, such as higher towing velocities.

SUMMARY OF THE INVENTION

The present invention is directed to providing an apparatus for isolating a towed sonar array from the noise created by a towing cable. A means is connected to the array and the cable for resiliently bearing the drag imposed by the towed array and another means is connected to the array and the cable for rigidly bearing the drag imposed by the towed array when the drag increases beyond a given magnitude. Another means is disposed about the resiliently bearing means and the rigidly bearing means for damping the noise and for resiliently encasing them.

A primary object of the invention is to provide an improved vibration isolation module.

Yet another object is to provide an apparatus for damping the vibrations imposed by a towing cable from a towed sonar array.

Another object of the invention is to provide a module which has several resilient load bearing members which are superseded by a rigid bearing member when increased levels of drag are imposed.

A further object of the invention is to provide for a vibration isolation module having an incompressible cross-sectional configuration to permit its passage through a hull penetrator.

Yet another object of the invention is to provide an apparatus having a cable for taking up increased loads.

Still another object is to provide an apparatus relying on a resilient rubber-like construction to reduce the transfer of unwanted noise.

Yet another object is to provide a vibration isolation module having a coaxially disposed load bearing member which bears the increased drag imposed by a towed hydrophone array after predetermined stress levels have been exceeded.

These and other objects of the invention will become more readily apparent from the ensuing description when taken with the drawings.

DESCRIPTION OF THE PREFERRED EMBODIMENT

Figure 1:
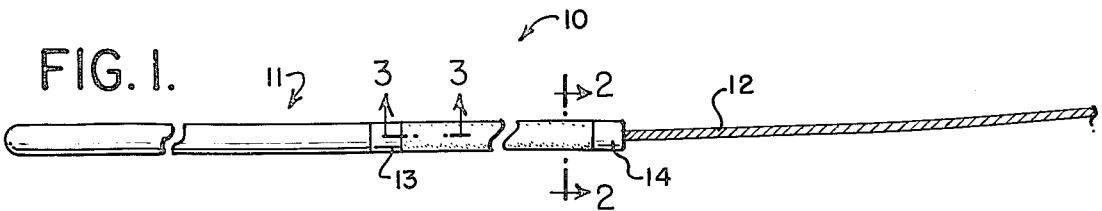
FIG. 1 is a depiction of the invention operationally deployed.

Referring now to the drawings, a vibration isolation module 10 is depicted as being interposed between a towed sonar array 11 and its towing cable 12. Cap members 13 and 14 connect the module to the array and cable and primarily function as anchoring points for the other elements.

The module, cap members and array usually have the same diameter to partially avoid the problems associated with excessive flow noise. Particularly, when the array is to function as a hydrophone for monitoring ship traffic or seismic phenomena, flow noise and the noises originating in the towing cable should be blocked from the array. Because of these constraints, the module has evolved to its present design.

Figure 2A:
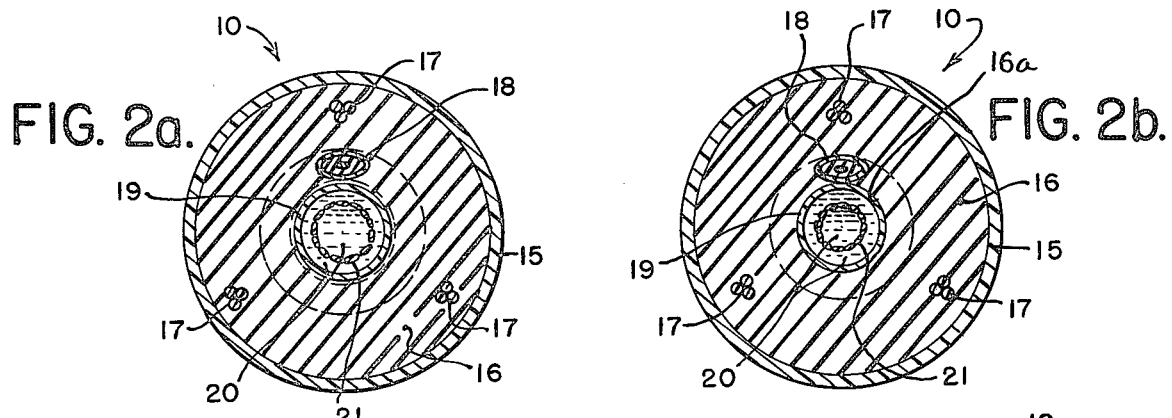
FIG. 2a is a cross-sectional view of the invention taken generally along lines 2—2 in FIG. 1.
Figure 3A:
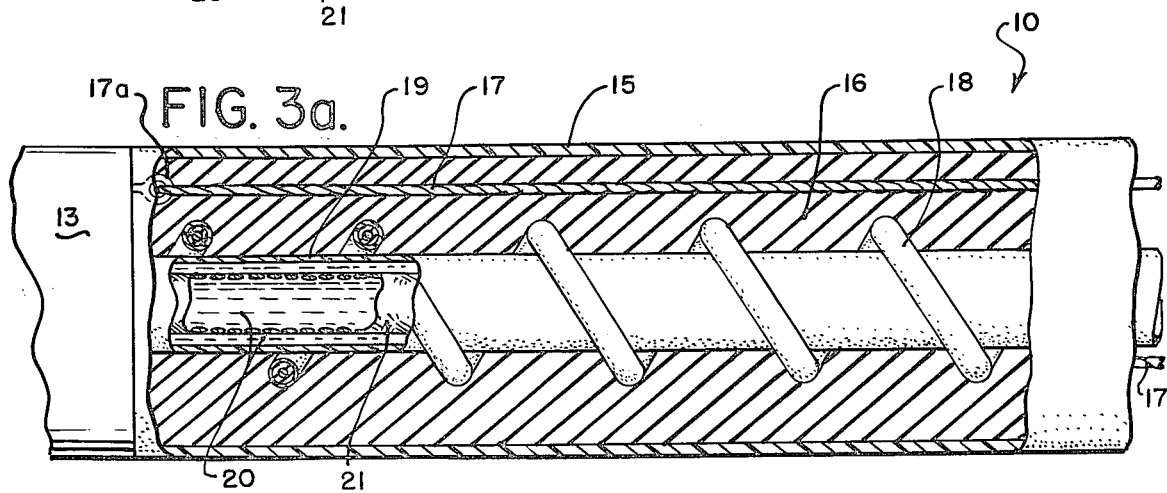
FIG. 3a is a cross-sectional view of the invention taken generally along lines 3—3 in FIG. 1.

Looking now to FIGS. 2a and 3a the module is hose-shaped and includes an outer envelope 15 fabricated from a flexible polyvinyl chloride material. The envelope is nearly filled with an oil extended polybutanate rubber 16 which, optionally, is bonded to the inner surface of the envelope. The envelope and rubber fill have a capability for stretching longitudinally about twenty-five percent without failing. The rubber fill has a longitudinal cavity 16a containing elements to be elaborated on below.

Three sets of a nylon line 17 are molded or otherwise suitably contained in the rubber fill and longitudinally extend the length of the module. They too can longitudinally stretch up to at least twenty-five percent of their original length without failing. At opposite ends the lines are connected to eyes 17a in the connector caps 13 and 14, the connection to the latter not being depicted in the drawings.

Signals, representative of impinging acoustic energy on the array if it is to function in the passive mode, or, as representative driving signals when the array is to function in the active mode, are transmitted via a helically extended electrical conductor 18. The conductor also runs the length of the vibration isolation module and is disposed along the inner wall of the cavity. An inner sheath 19 covers the inner wall and, like the outer envelope, is fabricated from a flexible, polyvinyl chloride compound.

The sheath is filled with a viscous petroleum jelly 20. The jelly serves as a work medium and fills the entire interior of the sheath but for a braided survival member 21, a typical one being a Kelvar Aramid single braided fiber having a four thousand pound breaking strength.

The survival member is anchored in caps 13 and 14 and similarly extends the entire length of the vibration isolation module. The survival member has a hollow braid cable construction very similar to a "Chinese finger trap". When the survival member is in the non-loaded condition, it radially dialates. When, however, the vibration isolation module is stretched, the survival member contracts. It becomes rigid as it becomes more taut but, while doing so, viscous jelly 20 passes through the braid and the volume of the cavity remains constant.

In operation, while the array is being towed at slower speeds, the module isolates the array from the strumming noise caused by the hydrodynamic forces reacting with the towing cable. The rubber fill 16 attenuates the strumming noises with respect to the towed array and the flexible nylon lines 17 help in acoustically decoupling the array from the cable. The braided member 21 does not bear an appreciable amount of the drag and for all practical purposes can be said to be not working as a load bearing member.

Figure 2B:
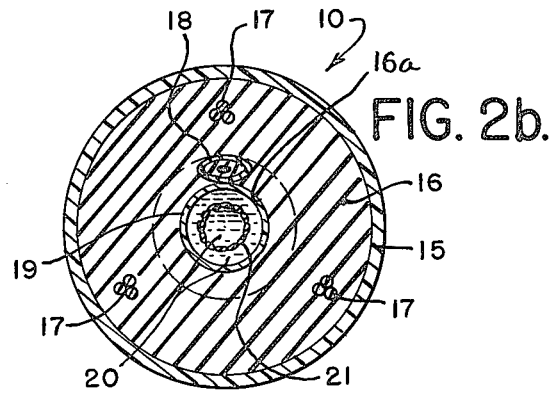
FIG. 2b is a cross-sectional view of the invention taken generally along lines 2—2 in FIG. 1 under increased drag loading.
Figure 3B:
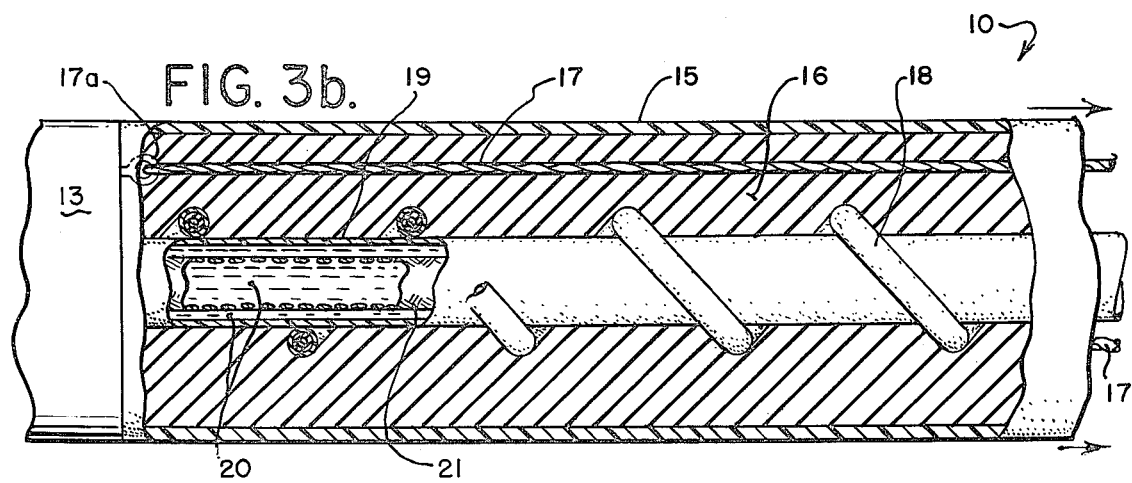
FIG. 3b is a cross-sectional representation of the invention taken along lines 3—3 in FIG. 1 under increased drag loading.

However, as the towing speeds are increased, there is an increase in the drag imposed by the sonar array. With the increased drag, nylon lines 17 stretch. As they stretch and the vibration isolation module increases its length by fifteen to twenty-five percent over its original length, survival member 21 contracts radially inwardly and becomes taut. In this condition it becomes the primary load bearing member and prevents the vibration isolation module's being torn apart and the consequent loss of the towed sonar array. Helically extending conduction 18 has enough length to be extended to accommodate the increased length of the vibration isolation module and it straightens out somewhat. The module assumes the shape shown in FIGS. 2b and 3b noting the contracted, decreased radial dimension of survival member 21.

It is noted that the strength member now forms a relatively rigid link between the cable and the towed array and, consequently, there might be a transmission of cable strumming noise to the array. However, with the increased towing speeds the increased flow noise along the array also is of such a magnitude as to compromise the effectiveness of the array.

After a higher speed run is finished and slower speeds are resumed, rubber fill 16 and nylon cords 17 pull and shorten the length of the module. This shortening causes the strength member 21 to dialate radially outwardly and the viscous jelly 20 seeps back through the braid of the member.

An advantage of having a solid filled envelope 15 is that it gives a heretofore greater acoustic attenuation along its length than did the contempory fluid-filled vibration isolation modules. Kerosene, the most common fluid used, does not provide a significant mechanical damping but actually serves as a noise transmission path. The rubber fill along with the nylon lines achieves a more satisfactory level of damping.

This vibration isolation module, because of its solid cross section provided yet another advantage, that being, it could be passed through a pressurized hull penetrator during deployment. Thus, the present module can be deployed and later retrieved for safe storage without calling for any elaborate stowage procedures.

Obviously, many modifications and variations of the present invention are possible in the light of the above teachings, and, it is therefore understood that the invention may be practiced otherwise than as specifically described.

What is claimed is:

1. An apparatus for isolating a towed sonar array from the noise created by a towing cable comprising:
   means connected to the array and the cable for resiliently bearing the drag imposed by the towed array;
   means connected to the array and the cable for rigidly bearing the drag imposed by the towed array when the drag increases beyond a given magnitude; and
   means disposed about the resiliently bearing means and the rigidly bearing means for damping the noise and for resiliently encasing them.

2. An apparatus for isolating a towed sonar array from the noise created by a towing cable comprising:
   means connected to the array and the cable for resiliently bearing the drag imposed by the towed array;
   means connected to the array and the cable for rigidly bearing the drag imposed by the towed array when the drag increases beyond a given magnitude, the rigidly bearing means is fabricated to permit radial motion in response to changing drag imposed by the towed array; and
   means disposed about the resiliently bearing means and the rigidly bearing means for damping the noise and for resiliently encasing them.

3. An apparatus according to claim 2 in which the rigidly bearing means is fabricated to permit radial contraction when it bears the increased drag.

4. An apparatus according to claim 3 in which the damping and resiliently encasing means is provided with a longitudinal cavity containing the rigidly bearing means.

5. An apparatus according to claim 4 further including:
   means filling the longitudinal cavity for viscously passing through the rigidly bearing means when it radially contracts.

6. An apparatus according to claim 5 further including:
   means disposed in the damping and resiliently encasing means for helically transmitting signals representative of impinging acoustic energy.

7. An apparatus according to claim 6 further including:
   means disposed on the outside of the damping and resiliently encasing means for enveloping same to present a streamlined surface.

8. An apparatus according to claim 7 further including:
   means disposed in the longitudinal cavity for containing the viscously passing means and the rigidly bearing means.

9. An apparatus according to claim 8 in which the resiliently bearing means is a number of nylon cord-like members circumferentially disposed in the damping and resiliently encasing means about the rigidly bearing means.

10. An apparatus according to claim 9 in which the rigidly bearing means is a hollow braid cable and the viscously passing means is a petroleum jelly.

11. An apparatus according to claim 10 in which the damping and resiliently encasing means is an oil extended polybutanate rubber filling the remaining space between the containing means and the enveloping means.

* * * * *